United States Patent
Alkhazragi et al.

(10) Patent No.: US 11,784,722 B2
(45) Date of Patent: Oct. 10, 2023

(54) COMMUNICATION SYSTEM FOR EXCHANGING DATA BETWEEN UNDERWATER DEVICES AND A LAND-BASED DATA COMMUNICATION NETWORK

(71) Applicant: KING ABDULLAH UNIVERSITY OF SCIENCE AND TECHNOLOGY, Thuwal (SA)

(72) Inventors: Omar Alkhazragi, Thuwal (SA); Mohamed-Slim Alouini, Thuwal (SA); Osama Amin, Thuwal (SA); Seifallah Jardak, Thuwal (SA); Boon Siew Ooi, Thuwal (SA); Basem Shihada, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 17/801,594

(22) PCT Filed: Feb. 22, 2021

(86) PCT No.: PCT/IB2021/051488
§ 371 (c)(1),
(2) Date: Aug. 23, 2022

(87) PCT Pub. No.: WO2021/171166
PCT Pub. Date: Sep. 2, 2021

(65) Prior Publication Data
US 2023/0079092 A1    Mar. 16, 2023

Related U.S. Application Data

(60) Provisional application No. 62/980,559, filed on Feb. 24, 2020.

(51) Int. Cl.
*H04B 10/00* (2013.01)
*H04B 13/02* (2006.01)
*H04J 14/00* (2006.01)

(52) U.S. Cl.
CPC .................................. *H04B 13/02* (2013.01)

(58) Field of Classification Search
CPC .................................................... H04B 10/80
See application file for complete search history.

(56) References Cited

U.S. PATENT DOCUMENTS

| 7,688,680 | B1 | 3/2010 | Gunasekara et al. |
| 10,250,337 | B1 | 4/2019 | Tobias et al. |
| 2016/0127042 | A1* | 5/2016 | Farr ........................ H04B 10/80 398/104 |

FOREIGN PATENT DOCUMENTS

| CN | 109039456 A | 12/2018 |
| CN | 110620596 A | 12/2019 |

OTHER PUBLICATIONS

International Search Report in corresponding/related International Application No. PCT/IB2021/051488, dated May 26, 2021.

(Continued)

*Primary Examiner* — Daniel G Dobson
(74) *Attorney, Agent, or Firm* — PATENT PORTFOLIO BUILDERS PLLC (57) ABSTRACT

A communication system includes a first communication gateway arranged proximate to a surface of a body of water and an underwater communication gateway. The underwater communication gateway is configured to receive data from a first underwater communication device using radio frequencies and the ethernet data link layer protocol, to convert the data received from the first underwater communication device from the ethernet data link layer protocol to the second data link layer protocol, and to transmit, using optical radiation and the second data link layer protocol, the (Continued)

data converted by the underwater communication gateway to the first communication gateway. The first communication gateway is configured to convert the data transmitted by the underwater communication gateway from the second data link layer protocol to the ethernet data link layer protocol, and to transmit, using the ethernet data link layer protocol, the data converted by the first communication device to a further communication device.

20 Claims, 6 Drawing Sheets

(56) References Cited

OTHER PUBLICATIONS

Written Opinion of the International Searching Authority in corresponding/related International Application No. PCT/IB2021/051488, dated May 26, 2021.

Substantive Examination Report in corresponding/related Saudi Arabian Application No. 522440277, dated Jun. 11, 2023.

* cited by examiner

COMMUNICATION SYSTEM FOR EXCHANGING DATA BETWEEN UNDERWATER DEVICES AND A LAND-BASED DATA COMMUNICATION NETWORK

CROSS-REFERENCE TO RELATED APPLICATIONS

This application is a U.S. National Stage Application of International Application No. PCT/IB2021/051488, filed on Feb. 22, 2021, which claims priority to U.S. Provisional Patent Application No. 62/980,559, filed on Feb. 24, 2020, entitled "AQUA-FI: ENABLING INTERNET IN UNDERWATER ENVIRONMENTS," the disclosures of which are incorporated herein by reference in their entirety.

BACKGROUND

Technical Field

Embodiments of the disclosed subject matter generally relate to wireless underwater communications, and more particularly to a communication system for exchanging data between underwater devices and a communication gateway proximate to the surface of a body of water.

Discussion of the Background

The Internet of Things (IoT) is envisioned as a way to connect many different devices to the Internet, beyond just computers and smart phones. For example, many appliances, televisions, automobiles, sensors, etc., are being connected to the Internet using wired or wireless connections. The wireless connection can be so-called terrestrial wireless connections, such as cellular communications and short-range communication technologies such as Wi-Fi and Bluetooth. In some cases, the wireless connection can involve satellites orbiting the earth. Although there are some differences between terrestrial and satellite communications, both technologies employ radio frequencies through a free-space environment, i.e., the atmosphere and space beyond the Earth's atmosphere.

Compared to terrestrial and satellite communications, there has been relatively less development in underwater communications. The most common underwater communication technology is acoustic communications, which typically provide very limited bandwidth for carrying voice and/or data.

Increased bandwidth could be achieved using radio-frequency communication technology. Because wireless underwater communications involve transmissions through water, conventional terrestrial and satellite communication solutions typically are not well-suited for an underwater environment. For example, conventional radio-frequency communication can only be achieved over very short distances in the water. Although wireless optical communications can exceed the distances of radio-frequency communication, underwater wireless optical communication presents its own challenges. The most significant of which is that optical beams are typically very narrow, and thus require maintaining line-of-sight between the optical transmitter and optical receiver for reliable link performance.

Existing underwater communication solutions are designed as point-to-point solutions, i.e., voice and/or data being provided from one device to a second device, where the second device is the last and only hop of the communication system. Accordingly, these systems have typically been designed using proprietary communication technologies, and in turn require each endpoint to be a specially-designed device that is configured to employ the proprietary communication technology. This limits adoption of this technology because of the additional costs incurred to purchase and deploy to special-purpose underwater communication devices.

Thus, it would be desirable to provide systems and methods for underwater communication that allow conventional wireless communication devices to communicate over distances without requiring modification of the programming or circuitry of the conventional wireless communication devices.

SUMMARY

According to an embodiment, there is a communication system, which includes a first communication gateway arranged proximate to a surface of a body of water. The first communication gateway includes a first communication interface that employs an ethernet data link layer protocol and a first optical communication interface that employs a second data link layer protocol. The second data link layer protocol is a data link layer protocol other than the ethernet data link layer protocol. The communication system also includes an underwater communication gateway having a second radio-frequency communication interface that employs the ethernet data link layer protocol and a second optical communication interface that employs the second data link layer protocol. The underwater communication gateway is configured to receive data from a first underwater communication device using radio frequencies and the ethernet data link layer protocol, to convert the data received from the first underwater communication device from the ethernet data link layer protocol to the second data link layer protocol, and to transmit, using optical radiation and the second data link layer protocol, the data converted by the underwater communication gateway to the first communication gateway. The first communication gateway is configured to convert the data transmitted by the underwater communication gateway from the second data link layer protocol to the ethernet data link layer protocol, and to transmit, using the ethernet data link layer protocol, the data converted by the first communication device to a further communication device.

According to another embodiment, there is a communications method involving receiving, by an underwater communication gateway from a first underwater communication device, data using radio frequencies and an ethernet data link layer protocol. The method also involves converting, by the underwater communication gateway, the data received from the first underwater communication device from the ethernet data link layer protocol to a second data link layer protocol, wherein the second data link layer protocol is a data link layer protocol other than the ethernet data link layer protocol. The method further involves transmitting, by the underwater communication gateway to a first communication gateway and using optical radiation and the second data link layer protocol, the data converted by the underwater communication gateway to the first communication gateway using optical radiation. Moreover, the method involves converting, by the first communication gateway, the data transmitted by the underwater communication gateway from the second data link layer protocol to the ethernet data link layer protocol. Additionally, the method involves transmitting, by the first communication gateway to a further communication device using the ethernet data link layer protocol, the data converted by the first communication gateway.

According to a further embodiment, there is a method involving providing a first communication gateway proximate to a surface of a body of water. The first communication gateway includes a first communication interface that employs an ethernet data link layer protocol and a first optical communication interface that employs a second data link layer protocol. The second data link layer protocol is a data link layer protocol other than the ethernet data link layer protocol. The method also involves providing an underwater communication gateway having a second radio-frequency communication interface that employs the ethernet data link layer protocol and a second optical communication interface that employs the second data link layer protocol. The underwater communication gateway is configured to receive data from a first underwater communication device using radio frequencies and the ethernet data link layer protocol, to convert the data received from the first underwater communication device from the ethernet data link layer protocol to the second data link layer protocol, and to transmit, using optical radiation and the second data link layer protocol, the data converted by the underwater communication gateway to the first communication gateway. The first communication gateway is configured to convert the data transmitted by the underwater communication gateway from the second data link layer protocol to the ethernet data link layer protocol and to transmit, using the ethernet data link layer protocol, the data converted by the first communication gateway to a further communication device.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of wireless communication systems.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1A:
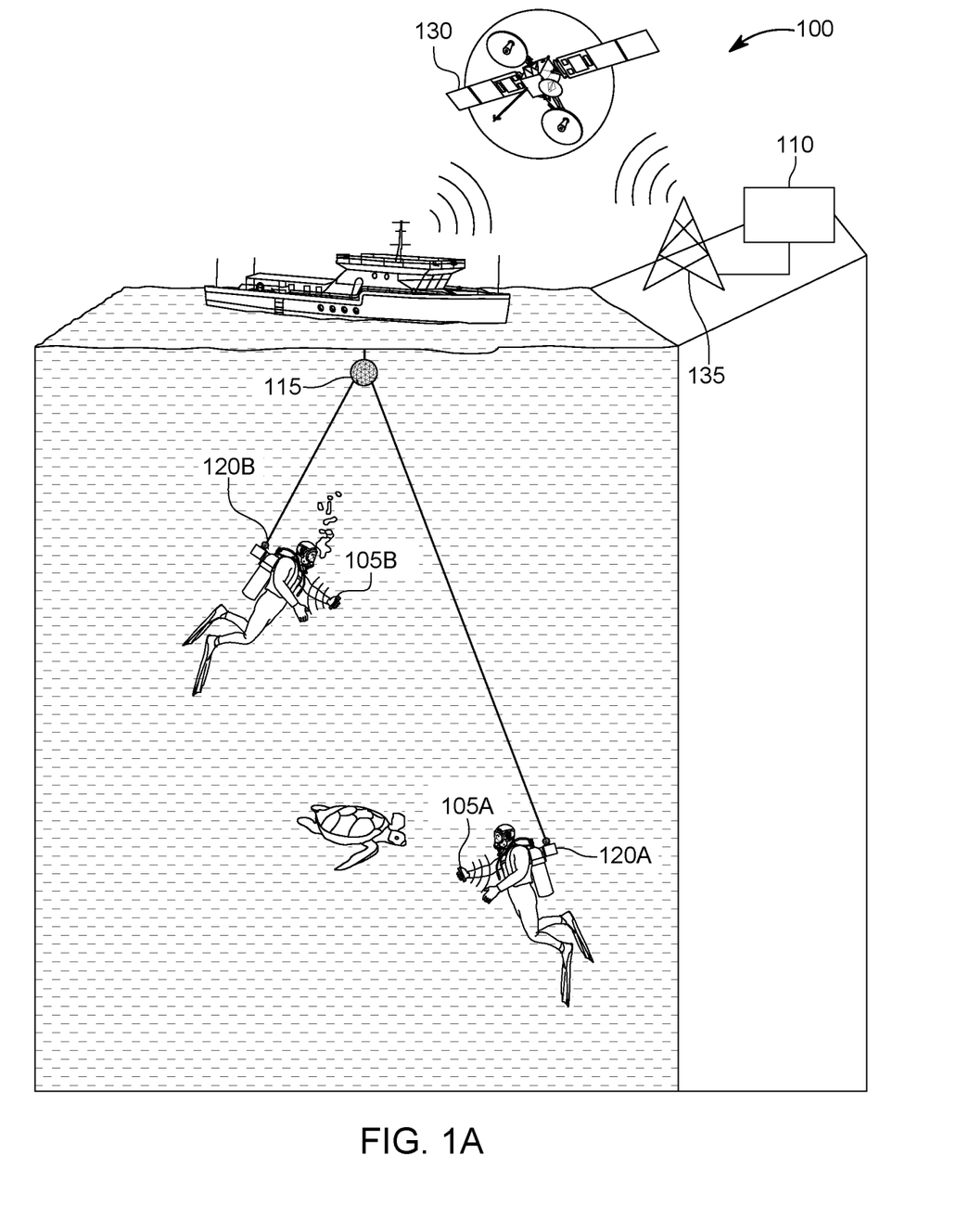
FIG. 1A is a schematic diagram of a communication system according to embodiments.
Figure 1B:
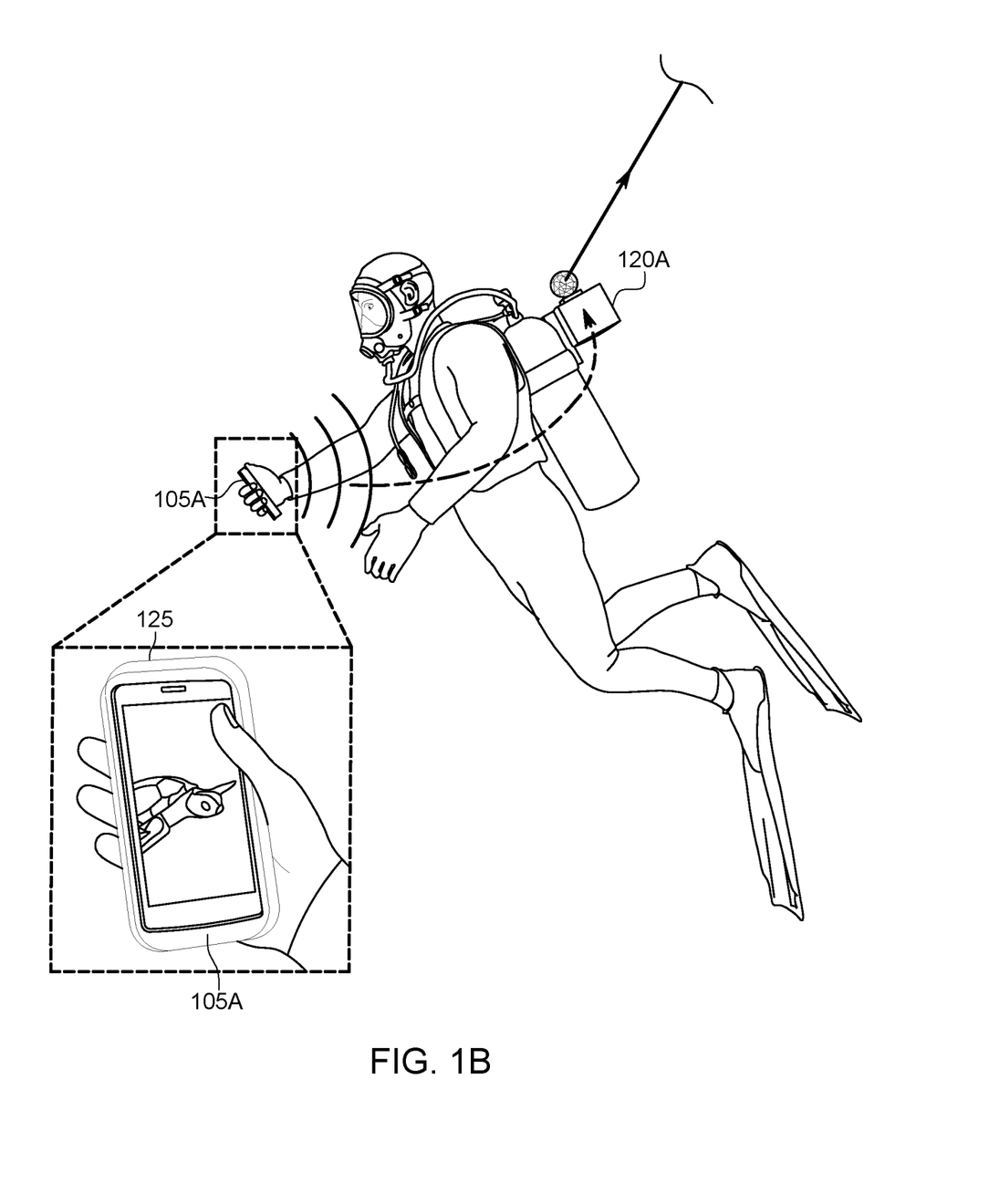
FIG. 1B is a schematic diagram of a part of a communication system according to embodiments.
Figure 2A:
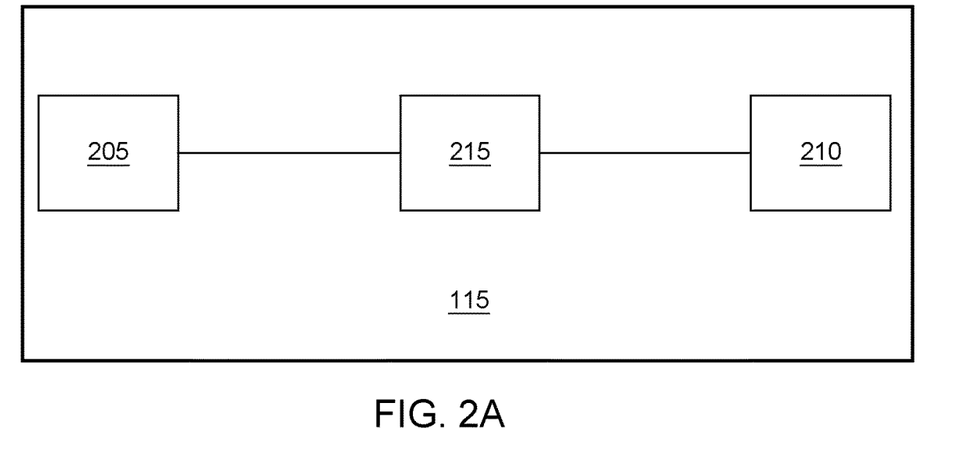
FIG. 2A is a schematic diagram of a first communication gateway according to embodiments.
Figure 2B:
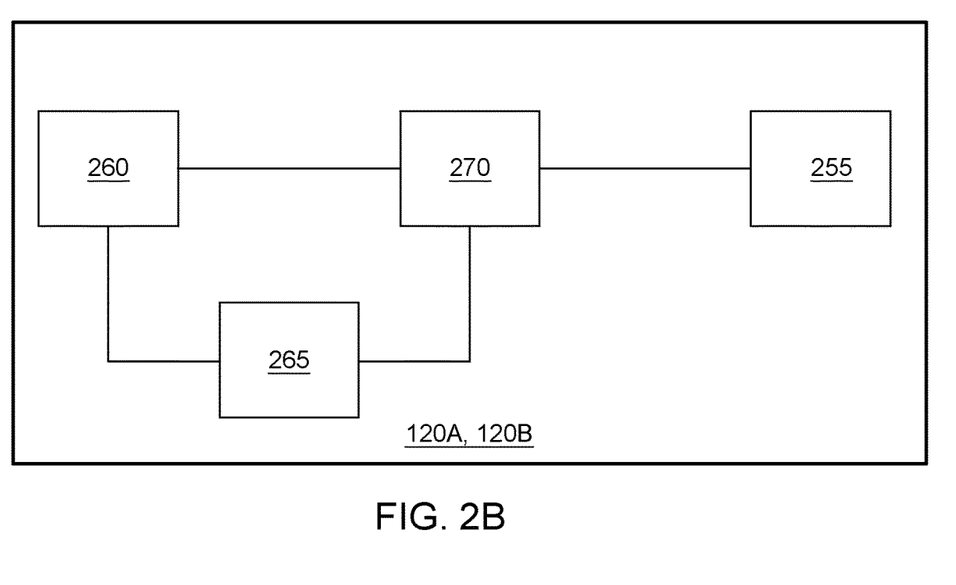
FIG. 2B is a schematic diagram of an underwater communication gateway according to embodiments.

Referring to FIGS. 1A and 1B, which respectively illustrate a communication system according to embodiments, and FIGS. 2A and 2B, which respectively illustrate a first communication gateway and an underwater communication gateway, exemplary embodiments are directed to a communication system 100. The communication system 100 includes one or more first communication gateways 115 arranged proximate to a surface of a body of water. The first communication gateway 115 includes a first radio-frequency communication interface 205 that employs an ethernet data link layer protocol and a first optical communication interface 210 that employs a second data link layer protocol. The second data link layer protocol is a data link layer protocol other than the ethernet data link layer protocol.

The communication system also includes one or more underwater communication gateways 120A or 120B comprising a second radio-frequency communication interface 255 that employs the ethernet data link layer protocol and a second optical communication interface 260 that employs the second data link layer protocol.

The underwater communication gateway 120A or 120B is configured to receive data from the first underwater communication device 105A or 105B, respectively, using radio frequencies and the ethernet data link layer protocol. The underwater communication gateway 120A or 120B is also configured to convert the data received from the first underwater communication device 105A or 105B from the ethernet data link layer protocol to the second data link layer protocol. The underwater communication gateway 120A or 120B is further configured to transmit, using optical radiation and the second data link layer protocol, the data converted by the underwater communication gateway 120A or 120B to the first communication gateway 115.

The first communication gateway 115 is configured to convert the data transmitted by the underwater communication gateway 120A or 120B from the second data link layer protocol to the ethernet data link layer protocol. The first communication gateway 115 is also configured to transmit, using the ethernet data link layer protocol, the data converted by the first communication device to a further communication device. In the illustrated embodiment, the further communication device (not illustrated) is connected to the land-based data communication network 110, such as the internet, using radio-frequency transmissions. However, the system does not require a connection to a land-based data communication network 110, in which case the further communication device can be on the ship, such as a server or communication device that exchanges data with the underwater communication devices 105A and 105B. Another alternative is for the first communication gateway 115 to be attached, for example, to a buoy, which also carries a server. In this case, the server can store data transmitted by the underwater communication device 105A or 105B, for example for offline processing. Further, the server can process data provided by the underwater communication device 105A or 105B and transmit the processed data back to the underwater communication device 105A or 105B. In any of these implementations, the first communication gateway can also exchange data between the underwater communication devices 105A and 105B.

In the embodiment illustrated in FIG. 1, the first communication gateway 115 is attached to a ship, which communicates with the land-based data communication network 110 via a satellite 130 and ground station 135, which can be considered as a second communication gateway. In other implementations, which can depend upon how far the ship is from the shore, the first communication gateway 115 can communicate directly with the ground station 135, for example, using microwave communication technology. Thus, it should be appreciated that there are a variety of different communication techniques that can be employed to connect with first communication gateway 115 with the land-based data network 110, and the disclosed system and method are not limited to any particular technology.

The underwater communication devices 105A or 105B can be any conventional wireless communication device which, when on the land could also communicate with terrestrial wireless communication systems, such as cellular or short-range communication systems that employ, for example, Wi-Fi or Bluetooth. Accordingly, as illustrated in FIG. 1B, the conventional communication device 105A can be enclosed in a water-proof enclosure 125. The underwater communication devices 105A and 105B should be understood as including any type of communication device that can communicate using radio frequencies and employing an ethernet data link layer protocol. Thus, the underwater communication devices 105A and 105B can be a cellular telephone, smart phone, wireless computer, a wearable device, a sensor (or any other type of Internet of Things communication device), etc.

In the illustrated embodiment, the underwater communication gateways 120A and 120B are affixed to a diver's oxygen tank. However, the underwater communication gateways 120A and 120B can be affixed at different locations, so long as it is sufficiently close to the first underwater communication device 105A and 105B, respectively. Those skilled in the art can readily determine such a range using known techniques. Thus, as one non-limiting example, one of the underwater communication gateways 120A or 120B could be affixed to an underwater vehicle used by the diver, such as an underwater sea scooter or the like. Although the illustrated embodiment involves mobile underwater communication devices 105A and 105B and mobile underwater communication gateways 120A and 120B, as noted above, the underwater communication device can be a sensor, in which case the sensor can be fixed and the underwater communication gateway 120A or 120B supporting the sensor can also be fixed, i.e., not mobile.

For ease of illustration and not limitation, FIG. 1A illustrates two underwater communication devices 105A or 105B and two underwater communication gateways 120A and 120B being served by a single first communication gateway 115. Thus, for example, a single first communication gateway 115 may support only a single underwater communication gateway or more than two underwater communication gateways. Further, multiple first communication gateways 115 can be deployed and the underwater communication gateways 120A and 120B can communicate with any one of the multiple first communication gateways 115, for example depending upon distance and/or orientation of the underwater communication gateways 120A and 120B relative to each of the multiple first communication gateways 115.

In an embodiment, first underwater communication device 105A or 105B communicates with the respective underwater communication gateway 120A or 120B using a short-range wireless radio-frequency technology, such as Wi-Fi or Bluetooth, both of which employ an ethernet data link layer protocol. Both of these technologies are also integrated in most conventional communication devices used on land. Using a short-range wireless radio-frequency technology is particularly advantageous because of the reduced power requirements of such technologies, which is critical for battery-powered devices, such as underwater communication devices 105A and 105B.

The particular data link layer protocol for the second data link layer protocol used between the first communication gateway 115 and the underwater communication gateways 120A and 120B can be any data link layer protocol other than ethernet protocol. In one non-limiting embodiment, the second data link layer protocol can be Point-to-Point Protocol (PPP). However, the second data link layer protocol can also be, for example, any protocol employing carrier-sense multiple access with collision avoidance (CSMA/CA). Further the second data link layer protocol can be synchronous data link control (SDLC) protocol, high-level data link control (HDLC) protocol, serial line internet protocol (SLIP), link control protocol (LCP), network control protocol (NCP), etc.

As will be appreciated from the discussion above, as well as detailed below, the communication system 100 employs an ethernet data link layer protocol between the first underwater communication device 105A or 105B and the underwater communication gateway 120A or 120B, respectively, and the first communication gateway 115 converts the data received in a second data link layer protocol back into the ethernet data link protocol, e.g., for local processing and/or for transmission to the land-based data communication network 110. This is particularly advantageous because it allows the use of a conventional communication device, such as a cellular or mobile telephone that has been properly waterproofed. In contrast, as noted above, conventional systems employ proprietary protocols between the underwater communication device and the second device, which increases costs of the communication system and increases complexity. Specifically, as those skilled in the art will recognize, the land-based data communication network, as well as most land-based wireless communication networks, employ an ethernet data link layer protocol, and thus the disclosed communication system 100 is able to easily interface between conventional communication devices, as well as conventional data communication networks. However, the ethernet data link layer protocol is not particularly well-suited for transmitting underwater more than several feet, and thus using a second data link layer protocol that is a data link layer protocol other than the ethernet data link layer protocol allows the use of a data link layer protocol that is more effective for longer distance wireless communication.

Additional details of the first communication gateway 115 and the underwater communication gateway 120A or 120B are now addressed in connection with FIGS. 2A and 2B. Because the underwater communication gateways 120A and 120B, as well as at least some or all of the first communication gateway 115, are intended to be employed under water, these gateways are contained within waterproof enclosures. As discussed above, first communication gateway 115 includes a first communication interface 205 that employs an ethernet data link layer protocol and a first optical communication interface 210 that employs a second data link layer protocol. When the first communication gateway 115 is configured to communicate with devices other than the underwater communication gateway 120A or 120B, for example with a device supported by the land-based data communication network 110, the first communication interface 205 include an antenna, transmitter and receiver (or a combined transceiver) as well as modulators, upconverters/downconverters, and other components necessary for communicating using radio frequencies.

The first optical communication interface 210 includes a light source, an optical receiver, as well as electronics for controlling the emission by the light source. The optical receiver can include a single optical receiver, such as a single photodiode, or a planar or spherical array of photodiodes, which would provide increased received signal strength and provides more flexibility in the pointing requirements towards the light source. In one embodiment, the optical receiver can be a solar cell array, which is particularly advantageous because it provides an optical receiver to support underwater optical communications while also providing a renewable energy source. Further, using an array or photodiodes or a solar cell arrays allows for Multiple-Input-Multiple-Output (MIMO) processing by individual photodiodes or cells, which can increase the strength of the received signal.

Depending upon implementation, the light source can be a light emitting diode (LED) and/or a laser. Specifically, if the first communication gateway 115 is expected to be relatively close to the underwater communication gateways 120A and 120B, then an LED can be provided as the light source, whereas if these components are expected to be further away from each other, a laser can be used as the light source because the laser will travel over larger distances underwater compared to an LED. It should be recognized, however, that the first optical communication interface 210 can include both an LED and a laser as light sources and can select the appropriate light source depending upon the distance of the underwater communication gateways 120A and 120B from the first communication gateway 115. Furthermore, the first communication gateway 115 can use an LED as a light source for communicating with one of the underwater communication devices 105A or 105B and can use a laser as the light source for communicating with the other one of the underwater communication devices 105A or 105B.

As illustrated, these communication interfaces 205 and 210 can be coupled to each other by a processor 215, which performs the conversion between the ethernet data link layer protocol and the second data link layer protocol. Assuming, for example, that PPP is employed as the second data link layer protocol, the processor 215 bridges the ethernet and PPP interfaces using, for example, IPv4 forwarding and iptables.

Processor 215 can be any type of processor, including, but not limited to, a microprocessor, field programmable gate array (FPGA), or an application specific integrated circuit. In one embodiment, the first communication getaway 115 can be implemented using an inexpensive computer, such as a Raspberry Pi. However, the first communication gateway 115 can also be implemented as an application-specific device using dedicated hardware for the communication interfaces and processor.

The first communication interface 205 is configured to communicate using the ethernet data link layer protocol. Thus, when the first communication gateway 115 is designed to locally store data from an underwater communication device 105A or 105B (e.g., it is attached to a ship or buoy and is coupled to a computer or server), the first communication gateway can communicate with the computer or server using the ethernet data link layer protocol. When the first communication getaway 115 is designed to relay communications to land-based data communication network 110, the first communication gateway 115 is a first radio-frequency communication gateway that can directly communicate with the satellite 130 or can use a communication device on the ship to relay the communications to the satellite 130. In the latter case, the first radio-frequency communication interface 205 can employ radio frequencies to communicate with a corresponding radio-frequency communication interface on board the ship. Alternatively, the first communication gateway 115 can use a wired connection to the ship, in which case the radio-frequency communication interface on board the ship would be considered as the first communication interface 205 of the first communication gateway 115.

Although the first communication interface 205, the first optical communication interface 210, and the processor 215 are illustrated as discrete components, these components can be integrated, for example, in the form of a small form-factor pluggable (SFP) transceiver, which are common in free-space optical (FSO) systems. SFP transceivers are capable of transferring gigabit data rate, in addition to integrating automatic gain control (AGC) in the receiver and automatic power control (APC) in the transmitter. The first radio-frequency communication interface 205 can also use, for example, an 8b/10b encoding scheme, as well as other features of IEEE802.3, such as error-correcting codes.

Turning now to FIG. 2B, as noted above, the underwater communication gateways 120A and 120B include a second radio-frequency communication interface 255 that employs the ethernet data link layer protocol and a second optical communication interface 260 that employs the second data link layer protocol. The second radio-frequency communication interface 255 include an antenna, transmitter and receiver (or a combined transceiver) as well as modulators, upconverters/downconverters, and other components necessary for communicating using radio frequencies.

The second optical communication interface 260 includes a light source, an optical receiver, as well as electronics for controlling the emission by the light source. The optical receiver can include a single optical receiver, such as a single photodiode, or a planar or spherical array of photodiodes, which would provide increased received signal strength and provides more flexibility in the pointing requirements towards the light source. In one embodiment, the optical receiver can be a solar cell array, which is particularly advantageous because it provides an optical receiver to support underwater optical communications while also providing a renewable energy source. The increased amount of power that can be provided by a solar cell array can be used to either reduce the size of the battery, and in turn of the underwater communication gateway 120A or 120B, or can be employed to support a higher-powered light source for underwater optical communications, such as a laser. Further, as noted above, using an array or photodiodes or a solar cell arrays allows for MIMO processing by individual photodiodes or cells, which can increase the strength of the received signal Depending upon implementation, the light source can be a light emitting diode (LED) and/or a laser. Specifically, if the first communication gateway 115 is expected to be relatively close to the underwater communication gateways 120A and 120B, then an LED can be provided as the light source, whereas if these components are expected to be further away from each other, a laser can be used as the light source because the laser will travel over larger distances underwater compared to an LED. It should be recognized, however, that the second optical communication interface 260 can include both an LED and a laser as light sources and can select the appropriate light source depending upon the distance of the underwater communication gateways 120A and 120B from the first communication gateway 115.

As illustrated in FIG. 2B, and similar to the discussion above in connection with FIG. 2A, the gateways 120A and 120B also include a processor 270 coupled between the communication interfaces 255 and 260, the processor 270 performing the conversion between the ethernet data link layer protocol and the second data link layer protocol. Assuming, for example, that PPP is employed as the second data link layer protocol, the processor 270 bridges the ethernet and PPP interfaces using, for example, IPv4 forwarding and iptables. Moreover, the processor can provide Dynamic Host Configuration Protocol daemon (DHCPD) to automatically assign IP addresses to the underwater communication devices 105A and 105B.

Processor 270 can be any type of processor, including, but not limited to, a microprocessor, field programmable gate array (FPGA), or an application specific integrated circuit. In one embodiment, the underwater communication getaways 120A and 120B can be implemented using an inexpensive computer, such as a Raspberry Pi. However, the underwater communication gateways 120A and 120B can also be implemented as an application-specific device using dedicated hardware for the communication interfaces and processor.

The underwater communication gateways 120A and 120B also include a positioning system 265, coupled to the second optical communication interface 260 and processor 270, that adjusts an orientation of an optical transmitter of second optical communication interface 260 to establish a line-of-sight path for the optical beam emitted by the optical transmitter. The positioning system 265 can operate independently of the processor 270 or can employ the processor to determine the proper orientation. There are many conventional techniques for maintaining a light-of-sight path for optical communication, any of which can be employed. For example, out-of-band techniques can be employed in which a different band is used as a control mechanism to localize and track of the first communication gateway 115. This could involve using acoustic signals for localization and tracking, using a camera to visually track the optical beam of the first communication gateway 115, etc. In-band techniques can include using signal-to-noise ratio (SNR) or received signal strength indicator (RSSI) values for determining the orientation required for the optimal alignment between the optical interfaces of the underwater communication gateways 120A and 120B and the first communication gateway 115.

Although the second radio-frequency communication interface 255, the second optical communication interface 260, and the processor 270 are illustrated as discrete components, these components can be integrated, for example, in the form of a small form-factor pluggable (SFP) transceiver, which those skill in the art will recognize are compact hot-pluggable devices that provide interface between networking equipment.

In the discussion above the underwater communication gateways 120A and 120B include a position adjusting system for maintaining a line-of-sight path with the optical interface of the first communication gateway 115. However, the first communication gateway 115 can include such a positioning system instead of, or in addition to, the underwater communication gateways 120A and 120B including such a position adjusting system.

A communication system based on the disclosed communication system was designed and tested using Raspberry Pi computers as the first communication gateway 115 and as an underwater communication gateway 120A or 120B. The system was tested in a swimming pool. The initial system build employed green LEDs (520 nm) as the optical transmitters and photodiodes as the optical receivers (DET10A2 from Thorlabs). Each optical transmitter was connected via a bias tee, used to set the DC bias for the laser to the Universal asynchronous receiver/transmitter (UART) transmit (Tx) line of a Raspberry Pi 3B. Each optical receiver was connected via an amplifier and comparator, to the receiving (Rx) UART line of the Raspberry Pi. This was duplicated on both ends of the system, so that a full-duplex communication was obtained.

PPP was used to modulate the laser using On-Off Keying (OOK) using the UART link. The transmitting Raspberry Pi was configured to forward the Ethernet interface to the PPP interface, allowing a connection to the Internet. The remote Raspberry Pi again forwarded packets from the PPP interface to the Ethernet interface, which was connected to an external access point. A mobile phone or tablet could thus connect via Wi-Fi to the first communication gateway, thus allowing the phone to connect to the Internet. The Ethernet and PPP interfaces were bridged using IPv4 forwarding and iptables. Dhcpd was provided at the access point end to automatically assign the hand-held device an IP address.

The communication system was designed to facilitate different power requirements and availability. For example, because the mobile communication gateways 120A and 120B operate under water where the low power requirements are greater, a DET10A2 photodiode outputting a signal from 0 to 80 mV was employed. The underwater transmitter was operated at 5V. For the first communication gateway, the Thorlabs PDA10A2 receiver, which is a photodiode with an integrated trans-impedance amplifier, with higher power requirements but outputting a signal between 0 and 1 V, was employed. The transmitter was operated at 12V for better reception. A higher range on the receiver means less noise is added during the amplification stages after the photodiode.

The initial system was also modified to employ a laser instead of an LED. Specifically, 0.3 W 520 nm SN-LDM-T-P TO-Can lasers from Salloor Technologies were employed. LED-based systems typically have a lower data rate due to their lower switching speeds, thus switching to lasers provided a faster system. The range of lasers is also considerably higher, but this is due to their higher power requirements compared to LEDs. Lasers are also considerably more expensive and have much higher pointing requirements.

The UART link rate was able to be increased to 1,000,000, providing up to 1 Mbps using OOK transmission. The rest of the software was unchanged.

The communication system performance was measured based on throughput, latency, and packet loss when the optical beam is fully aligned with both the transmitter and receiver, and the underwater channel is static. Four parallel streams, which denotes to four different traffic carried via the internet optical link, were employed. The throughput was measured using iperf3 and it was found that a maximum of 2.11 Mbps was achieved based on the sum of the four streams. Moreover, it was observed that there was approximate symmetry between both links, which verifies the link stability. Latency was measured using ping and the round-trip time for different packets were observed. Latency was measured at an average of 1.03 ms with no load. Under stress tests, latency went up to a maximum of 85.5 ms, though CPU load as measured with top was low, so this delay must be due to physical link performance. Packet loss was measured using a flood ping at 0%, and iperf3 tests resulted in no packet loss when running TCP tests. UDP tests lost packets when pushed past 17 Mbps.

As an alternative to the 520 nm laser noted above, 450 nm lasers (from SaNoor Technologies) can be employed with the transmit power monitored by an external photodiode. In order to boost the voltage and current for the higher power laser, high speed op-amps in a differential amplifier configuration connected to a constant current driver can be employed. The optical receivers can be replaced by visible light photodiodes with integrated transimpedance amplifiers (capable of 1.25 Gbps), which also integrate AGC functionality (part FCI-H125G-010 from OSI Optoelectronics). SFP to Ethernet converters (MC220L Gigabit Ethernet Media Converters from TP-Link) can be used to bridge the optical network to Ethernet, which thus allows connections to gateway and to the internet. It should be recognized that the discussion above in connection with the tested system is but one example implementation and that the discussion preceding and following this description of an example implementation should not be limited by the particulars of the example implementation.

Figure 3:
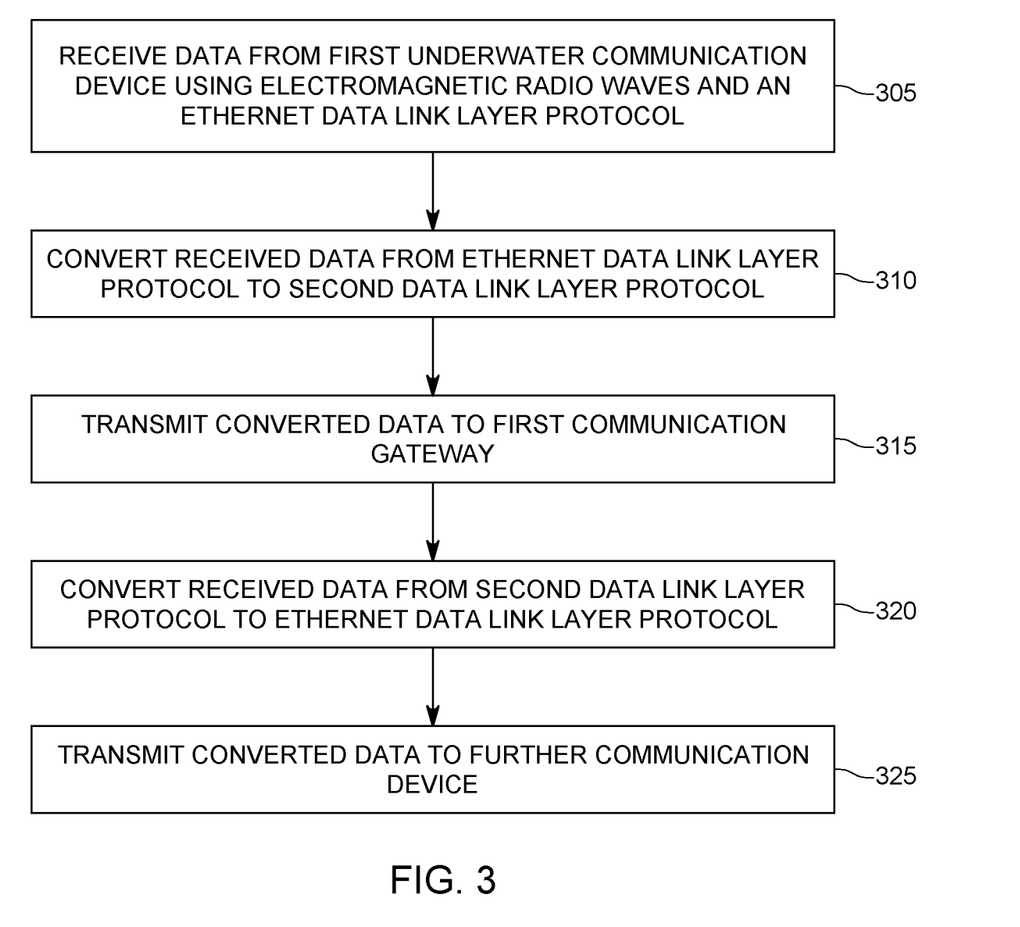
FIG. 3 is a flow diagram of a method of transmitting communications from an underwater communication device to a land-based data communication network according to embodiments.
Figure 4:
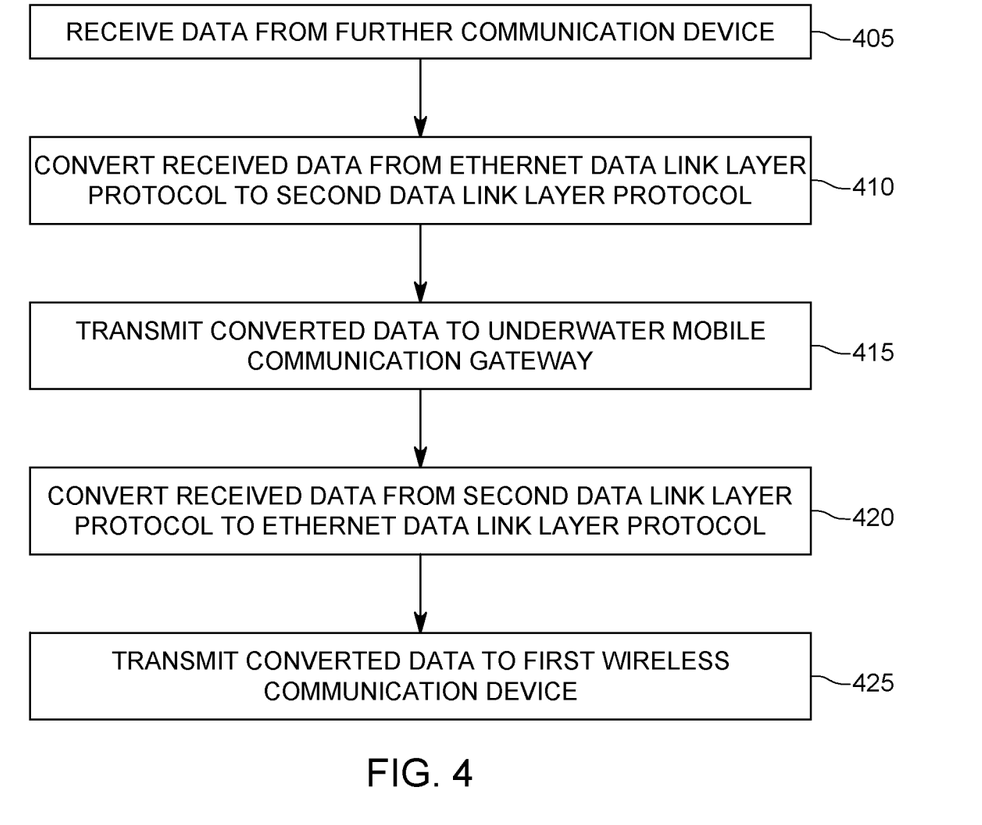
FIG. 4 is a flow diagram of a method of transmitting communications from a land-based data communication network to an underwater communication device according to embodiments.

FIGS. 3 and 4 are flow diagrams of methods of exchanging communications from a first underwater communication device 105A or 105B to a land-based data communication network 110 and from the land-based data communication network 110 to a first underwater communication device 105A or 105B, respectively. Referring first to FIG. 3, an underwater communication gateway 120A or 120B receives, from the first underwater communication device 105A or 105B, respectively, data using radio frequencies and an ethernet data link layer protocol (step 305).

The underwater communication gateway 120A or 120B converts the data received from the first underwater communication device 105A or 105B from the ethernet data link layer protocol to a second data link layer protocol (step 310). The second data link layer protocol is a data link layer protocol other than the ethernet data link layer protocol.

The underwater communication gateway 120A or 120B transmits, to a first communication gateway 115 and using optical radiation and the second data link layer protocol, the data converted by the underwater communication gateway 120A or 120B to the first communication gateway using optical radiation (step 315).

The first communication gateway 115 converts the data transmitted by the underwater communication gateway 120A or 120B from the second data link layer protocol to the ethernet data link layer protocol (step 320).

The first communication gateway 115 transmits, to a further communication device using the ethernet data link layer protocol, the data converted by the first communication gateway 115.

Turning now to FIG. 4, initially, the first communication gateway receives 115 data from the further communication device addressed to the first underwater communication device 105A or 105B (step 405).

The first communication gateway 116 converts the data from the ethernet data link layer protocol to the second data link layer protocol (step 410). The first communication gateway 116 transmits the converted data in the second data link layer protocol to the underwater communication gateway using optical radiation (step 415). The underwater communication gateway 120A or 120B receives, from the first communication gateway 115, the transmitted data (step 420).

The underwater communication gateway 120A or 120B converts the data received from the first communication gateway 115 from the second data link layer protocol to the ethernet data link layer protocol (step 425). The underwater communication gateway 120A or 120B transmits the converted data having the ethernet data link layer protocol to the first underwater communication device 105A or 105B (step 430).

Figure 5:
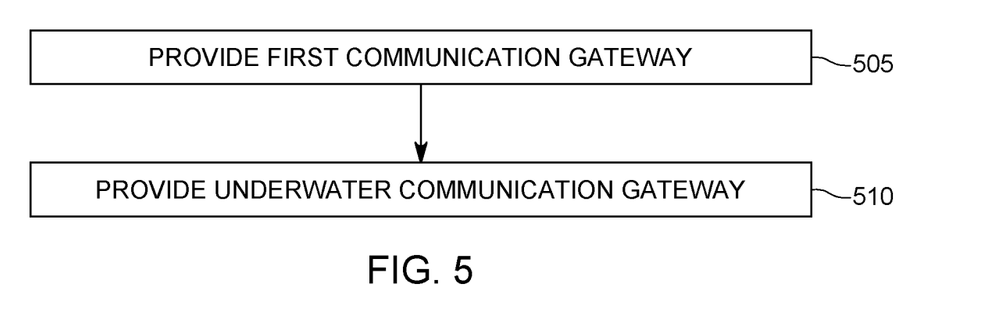
FIG. 5 is a flow diagram for providing a communication network according to embodiments.

FIG. 5 is a flow diagram for providing a communication network according to embodiments. A first communication gateway 115 is provided proximate to a surface of a body of water (step 505). The first communication gateway 115 includes a first communication interface 205 that employs an ethernet data link layer protocol and a first optical communication interface 210 that employs a second data link layer protocol, wherein the second data link layer protocol is a data link layer protocol other than the ethernet data link layer protocol.

An underwater communication gateway 120A or 120B is also provided (step 510). The underwater communication gateway 120A or 120B comprises a second radio-frequency communication interface 255 that employs the ethernet data link layer protocol and a second optical communication 260 interface that employs the second data link layer protocol.

The underwater communication gateway 120A or 120B is configured to receive data from a first underwater communication device 105A or 105B using radio frequencies and the ethernet data link layer protocol, to convert the data received from the first underwater communication device 105A or 105B from the ethernet data link layer protocol to the second data link layer protocol, and to transmit, using optical radiation and the second data link layer protocol, the data converted by the underwater communication gateway 120A or 120B to the first communication gateway 115.

The first communication gateway 115 is configured to convert the data transmitted by the underwater communication gateway 120A or 120B from the second data link layer protocol to the ethernet data link layer protocol and to transmit, using the ethernet data link layer protocol, the data converted by the first communication gateway 115 to a further communication device. When the first communication gateway 115 is configured to communicate with the land-based data communication network 110, the first communication gateway also employs radio-frequencies to transmit the data converted by the first communication gateway 115.

As will be appreciated from the discussion above, employing an ethernet data link layer protocol in the disclosed communication system is particularly advantageous because it allows the use of conventional communication devices, which when waterproofed, e.g., using a case, in an underwater environment without requiring any further modifications of the conventional communication device because the first hop employs the same ethernet data link layer protocol that the conventional communication device is already configured with for communication with terrestrial-based communication systems, such as Wi-Fi or Bluetooth.

The disclosed embodiments provide a communication system for exchanging data between underwater devices and a communication gateway proximate to the surface of a body of water. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A communication system comprising:
   a first communication gateway arranged proximate to a surface of a body of water, wherein the first communication gateway includes a first communication interface that employs an ethernet data link layer protocol and a first optical communication interface that employs a second data link layer protocol, wherein the second data link layer protocol is a data link layer protocol other than the ethernet data link layer protocol;
   an underwater communication gateway comprising a second radio-frequency communication interface that employs the ethernet data link layer protocol and a second optical communication interface that employs the second data link layer protocol,
   wherein the underwater communication gateway is configured to receive data from a first underwater communication device using radio frequencies and the ethernet data link layer protocol, to convert the data received from the first underwater communication device from the ethernet data link layer protocol to the second data link layer protocol, and to transmit, using optical radiation and the second data link layer protocol, the data converted by the underwater communication gateway to the first communication gateway,
   wherein the first communication gateway is configured to convert the data transmitted by the underwater communication gateway from the second data link layer protocol to the ethernet data link layer protocol, and to transmit, using the ethernet data link layer protocol, the data converted by the first communication device to a further communication device.

2. The communication system of claim 1, wherein the further communication device is part of a land-based data network and the first communication gateway is configured to transmit, using radio frequencies and the ethernet data link layer protocol, the data converted by the first communication gateway to further communication device via the land-based data communication network.

3. The communication system of claim 1, wherein the underwater communication gateway is configured for attachment to a diving oxygen tank.

4. The communication system of claim 1, wherein the underwear mobile communication gateway is configured for attachment to an underwater vehicle.

5. The communication system of claim 1, wherein the underwater communication gateway comprises:
   an optical transmitter configured to generate the optical radiation; and
   a positioning system for adjusting an orientation of the optical radiation emitted by the optical transmitter.

6. The communication system of claim 5, wherein the optical transmitter includes a laser or light-emitting diode, LED.

7. The communication system of claim 5, wherein the positioning system of the mobile communication gateway comprises at least one camera configured to track optical radiation emitted by the first communication gateway.

8. The communication system of 5, wherein the positioning system of the underwater communication gateway employs out-of-band signaling for adjusting the orientation of the optical radiation emitted by the optical element, wherein the out-of-band signaling comprises acoustic communication between the underwater communication gateway and the first communication gateway.

9. The communication system of claim 5, wherein the underwater communication gateway further comprises:
   an optical receiver; and
   a processor,
   wherein the processor is configured to control the positioning system to adjust the orientation of the optical radiation emitted by the optical transmitter based on a strength of optical signals received by the optical receiver from the first communication gateway.

10. The communication system of claim 9, wherein the optical receiver is a solar cell.

11. The communication system of claim 2, wherein the first communication gateway comprises an optical emitter and optical receiver arranged under the surface of the body of water.

12. The communication system of claim 11, further comprising:
   a second communication gateway, which is arranged above the surface of the body of water and which is configured to receive the data transmitted by the first communication gateway and to transmit the received data to the land-based data communication network.

13. The communication system of claim 12, wherein the second communication gateway is configured to transmit the received data to the land-based data communication network via a satellite communication system.

14. The communication system of claim 12, wherein the second communication gateway is configured to transmit the received data directly to the land-based data communication network.

15. A communications method comprising:
   receiving, by an underwater communication gateway from a first underwater communication device, data using radio frequencies and an ethernet data link layer protocol;
   converting, by the underwater communication gateway, the data received from the first underwater communication device from the ethernet data link layer protocol to a second data link layer protocol, wherein the second data link layer protocol is a data link layer protocol other than the ethernet data link layer protocol;
   transmitting, by the underwater communication gateway to a first communication gateway and using optical radiation and the second data link layer protocol, the data converted by the underwater communication gateway to the first communication gateway using optical radiation;

converting, by the first communication gateway, the data transmitted by the underwater communication gateway from the second data link layer protocol to the ethernet data link layer protocol; and transmitting, by the first communication gateway to a further communication device using the ethernet data link layer protocol, the data converted by the first communication gateway.

16. The method of claim 15, further comprising:

receiving, by the first communication gateway, data from the further communication device addressed to the first underwater communication device;

converting, by the first communication gateway, the data from the ethernet data link layer protocol to the second data link layer protocol;

transmitting, by the first communication gateway, the converted data in the second data link layer protocol to the underwater communication gateway using optical radiation;

receiving, by the underwater communication gateway from the first communication gateway, the transmitted data;

converting, by the underwater communication gateway, the data received from the first communication gateway, from the second data link layer protocol to the ethernet data link layer protocol; and transmitting, by the underwater communication gateway, the converted data having the ethernet data link layer protocol to the first underwater communication device.

17. The method of claim 15, further comprising:

adjusting an orientation of an optical emitter of the underwater communication gateway or of the first communication gateway so that the optical emitter of the underwater communication gateway or of the first communication gateway is aligned with an optical receiver of the other one of the underwater communication gateway and the first communication gateway.

18. A method, comprising:

providing a first communication gateway proximate to a surface of a body of water, wherein the first communication gateway includes a first communication interface that employs an ethernet data link layer protocol and a first optical communication interface that employs a second data link layer protocol, wherein the second data link layer protocol is a data link layer protocol other than the ethernet data link layer protocol; and providing an underwater communication gateway comprising a second radio-frequency communication interface that employs the ethernet data link layer protocol and a second optical communication interface that employs the second data link layer protocol, wherein the underwater communication gateway is configured to receive data from a first underwater communication device using radio frequencies and the ethernet data link layer protocol, to convert the data received from the first underwater communication device from the ethernet data link layer protocol to the second data link layer protocol, and to transmit, using optical radiation and the second data link layer protocol, the data converted by the underwater communication gateway to the first communication gateway, wherein the first communication gateway is configured to convert the data transmitted by the underwater communication gateway from the second data link layer protocol to the ethernet data link layer protocol and to transmit, using the ethernet data link layer protocol, the data converted by the first communication gateway to a further communication device.

19. The method of claim 18, further comprising:

providing the underwater communication gateway with an optical transmitter configured to generate the optical radiation and with a positioning system for adjusting an orientation of the optical radiation emitted by the optical transmitter.

20. The method of claim 19, further comprising:

employing, by the positioning system, out-of-band signaling for adjusting the orientation of the optical radiation emitted by the optical element, wherein the out-of-band signaling comprises acoustic communication between the underwater communication gateway and the first communication gateway.

* * * * *